US006892102B1

(12) United States Patent
Fushimi

(10) Patent No.: US 6,892,102 B1
(45) Date of Patent: May 10, 2005

(54) SIGNAL PROCESSOR FOR A JOYSTICK INPUT DEVICE

(75) Inventor: Kazunori Fushimi, Tokyo (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/890,543

(22) PCT Filed: Dec. 28, 1999

(86) PCT No.: PCT/JP99/07389

§ 371 (c)(1), (2), (4) Date: Aug. 2, 2001

(87) PCT Pub. No.: WO01/48386

PCT Pub. Date: Jul. 5, 2001

(51) Int. Cl.$^7$ ................................................ G05B 15/00

(52) U.S. Cl. ........................... 700/85; 700/83; 345/156; 345/157; 345/158; 345/159; 345/161; 345/163; 345/167

(58) Field of Search .............................. 700/85, 83, 13, 700/56, 62–63, 66; 345/156–159, 161, 163, 167

(56) References Cited

U.S. PATENT DOCUMENTS 4,680,929 A * 7/1987 Mouri et al. .................. 60/368
5,123,331 A * 6/1992 Hirai ........................ 91/363 A
5,642,653 A 7/1997 Hutchison .................... 91/459
6,342,880 B2 * 1/2002 Rosenberg et al. ......... 345/161

FOREIGN PATENT DOCUMENTS

| | | | | |
|---|---|---|---|---|
| JP | 56-97604 | | 8/1981 | |
| JP | 4-143334 | | 5/1992 | |
| JP | 04143334 A | * | 5/1992 | ............ E02F/9/22 |
| JP | 4-151007 | | 5/1992 | |
| JP | 5-17401 | | 3/1993 | |
| JP | 07-054806 | | 2/1995 | |

* cited by examiner

*Primary Examiner*—Anthony Knight
*Assistant Examiner*—Ronald D Hartman, Jr.
(74) *Attorney, Agent, or Firm*—Rabin & Berdo, P.C.

(57) ABSTRACT

A signal processor for a joystick which includes a joystick input device (11) which varies a joystick voltage input value Vi according to an operating amount of a joystick (10) from a neutral position (11), an input circuit (13) which outputs the average value of the joystick voltage input value Vi read at every sampling time over a predetermined number of past occasions as a joystick voltage computation value Vic, a computation circuit (14) which computes an output computation value Voc set according to the joystick voltage computation value Vic, and operation start detecting circuit which detects an operation start when the joystick (10) is pushed over from the neutral position. The computation circuit (14) increases the output computation value Voc to an effective maximum value when operation starts. In this way, over-sensitivity of the control response when there is a sudden operation of the joystick (10) is suppressed.

5 Claims, 5 Drawing Sheets

SIGNAL PROCESSOR FOR A JOYSTICK INPUT DEVICE

FIELD OF THE INVENTION

This invention relates to a signal processor which outputs a signal according to the input amount of a joystick, and mainly controls the operation of a hydraulic actuator via a proportional solenoid valve in a work machine such as a forklift or a power shovel.

BACKGROUND OF THE INVENTION

Tokukouhei 5-17401, which is was published by the Japanese Patent Office in 1993, discloses a signal processor which outputs a current according to an input voltage from a joystick input device in order to control a device that is controlled by a proportional solenoid valve or the like. This is done by varying the valve opening of the proportional solenoid valve according to an amount by which a joystick is inclined from a neutral position, and thereby controls the motion of a hydraulic actuator.

FIG. 6 is a characteristic diagram showing the relation of a time t from when the joystick is operated, and a displacement amount S of the hydraulic actuator which is hydraulically driven via the proportional solenoid valve. In a conventional device, as shown by the single dotted line, a time a until the actuator begins to move is long, and response is poor. This may be due to a delay with which the current output to the proportional solenoid valve appears due to the inductance produced in a coil, or to an overlap part in which the flow of working oil in the proportional solenoid valve cannot be changed over even if the valve body moves slightly between each position.

Moreover, when the joystick is operated rapidly, the current output to the proportional solenoid valve appears suddenly after the time a from starting operation has elapsed, so the working oil flowrate controlled by the proportional solenoid valve changes suddenly, and the work device driven by the actuator suffers a shock.

It is therefore an object of this invention to provide a signal processor for a joystick input device which maintains good response when the joystick starts to be operated, and prevents a shock from occurring in an actuator or the like corresponding to sudden operation of the joystick.

DISCLOSURE OF THE INVENTION

This invention provides a signal processor for a joystick input device which varies a joystick voltage input value Vi according to an operating amount of a joystick from a neutral position, an input means which outputs the average value of the joystick voltage input value Vi read at every sampling time over a predetermined number of past occasions as a joystick voltage computation value Vic, and computation means which computes an output computation value Voc set according to the joystick voltage computation value Vic. As the change of the output operation value Voc is delayed relative to the change of the joystick voltage input value Vi, control sensitivity to sudden operation of the joystick can be mitigated. Further, the control response can easily be changed by changing the number of data which computes an average value in an input means.

Further this invention provides and operation start detecting means which detects an operation start when the joystick is pushed over from the neutral position, wherein the computation means increases the output computation value Voc to a predetermined value according to the joystick voltage computation value Vic when operation starts. Hence, the output computation value Voc is momentarily increased when the joystick starts operating, and control response is improved.

Further this invention provides an input means which outputs the average value of the joystick voltage input value Vi read at every sampling time over a predetermined number of past occasions as a joystick voltage computation value Vic, and operation start detecting means which detects an operation start when the joystick is pushed over from the neutral position, wherein the computation means increases the output computation value Voc to an effective maximum value when operation starts. As the output computation value Voc increases momentarily when the joystick starts operating, the control response is improved. Thus, as the change of the output computed value Voc relative to change of the joystick voltage input value. Vi is delayed, control response to a sudden operation of the joystick can be suppressed.

DESCRIPTION OF THE PREFERRED EMBODIMENTS

This invention will now be described in further detail referring to the attached drawings.

Figure 1:
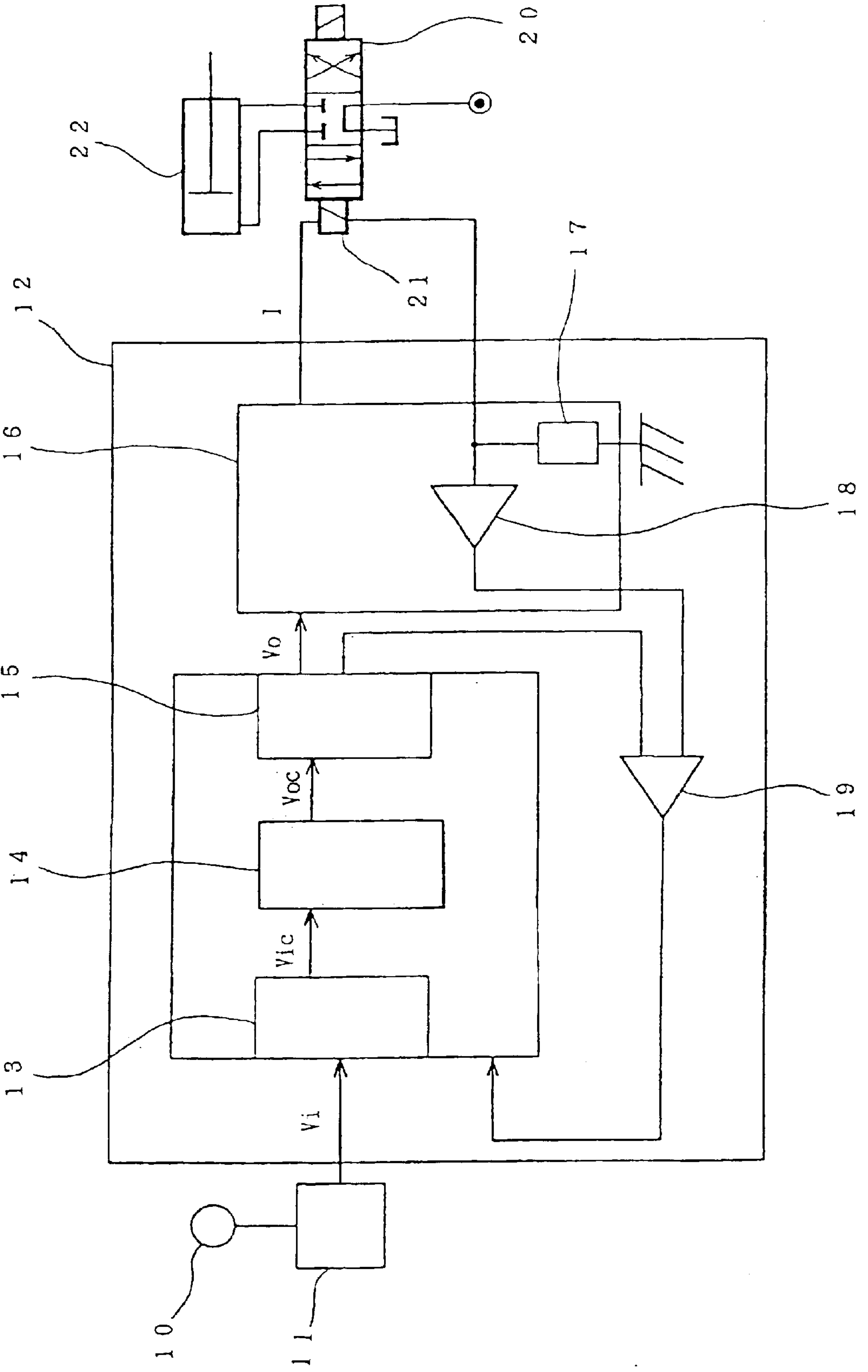
FIG. 1 is a system diagram relating to this invention.

FIG. 1 is a system diagram comprising a signal processor of a joystick input device. A hydraulic cylinder 22 is an actuator provided in a work machine such as a forklift. A proportional solenoid valve 20 changes over the flow of working oil supplied to or discharged to the oil hydraulic cylinder 22 via a pair of proportional solenoids 21, and thereby controls elongation and contraction of the hydraulic cylinder 22. The proportional solenoid valve 20 controls the rate at which the hydraulic cylinder 22 elongates and contracts by adjusting the flowrate of working oil according to an energizing current flowing through the proportional solenoids 21.

In FIG. 1, a symbol 10 is a joystick operated by an operator. A symbol 11 is a joystick input device outputting a joystick voltage input value Vi according to an operating amount of the joystick 10 which inclines from a neutral position. A symbol 12 is a controller controlling a current I which energizes the proportional solenoids 21 according to the joystick voltage input value Vi from the joystick input device 11.

The controller 12 comprises an input circuit (AD converter) 13 which changes the joystick voltage input value Vi from the joystick input device 11 into a digital signal, a computation circuit 14 which computes an output operation value Voc set according to the joystick voltage input value Vi, an output circuit (DA converter) 15 which converts the computed output operation value Voc into an analog signal Vo, and a drive circuit 16 which sends the output current I according to the output value Vo to the proportional solenoids 21.

The input circuit 13 reads the joystick voltage input value Vi at a predetermined sampling time (for example, 5 milliseconds), and converts the joystick voltage input value Vi into digital signal data.

However, if the computation circuit 14 computes the output computed value Voc according to the joystick voltage input value Vi by using this data as it is, when the joystick input device 11 is operated rapidly, the working oil flow rate controlled by the proportional solenoid valve 20 changes suddenly, and a shock occurs in the motion of the work machine.

As the input means of this invention, the input circuit 13 reads the joystick voltage input value Vi at each predetermined sampling time, the average value of the data read for example over the past 15 occasions and on the present occasion is computed, and the computation result is output to the computation circuit 14 as a joystick voltage computation value Vic. Hence, as the change in the output operation value Voc is delayed relative to the change of the joystick voltage input value Vi, the operation of the proportional solenoid valve 20 is delayed.

A construction may also be used wherein the joystick voltage output value Vic is computed in the computation circuit 14 as the input means of this invention.

Figure 2:
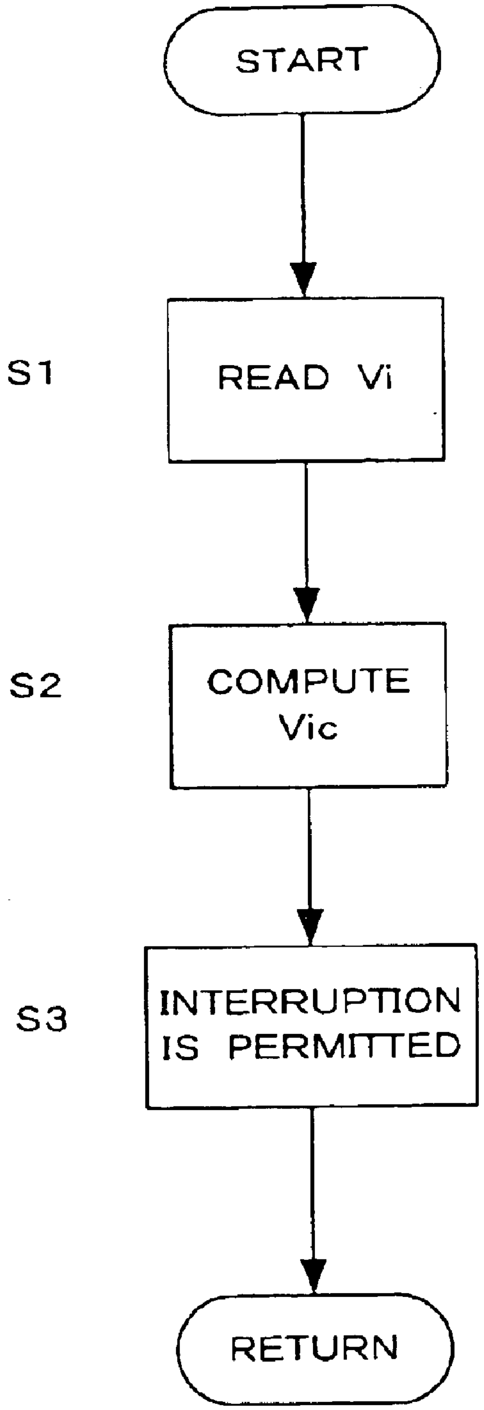
FIG. 2 is a flowchart showing the processing routine of an input circuit.

The flowchart of FIG. 2 shows the processing routine of the input circuit 13, which is performed at a predetermined sampling time.

In a step S1, the joystick voltage input value Vi is read. In a step S2, the average value obtained by dividing the sum of the data read on the past 15 occasions times and the data read on the present occasion by 16, is computed as the joystick voltage computation value Vic. In a step S3, interruption of the input circuit 13 is permitted. For example, when the joystick input device 11 is operated rapidly and the joystick voltage input value Vi changes from 0 to X, the joystick voltage operation value Vic is X/16 on the first sampling, the joystick voltage operation value Vic is 2X/16 on the second sampling, and the joystick voltage operation value Vic is 16X/16 (=X) on the 16th sampling. If the sampling time is 5 milliseconds, the time taken to perform 16 samplings is 5×16=80 milliseconds, and the joystick voltage computation value Vic converges after 80 has elapsed. For this reason, the proportional solenoid valve 20 operates over 80 milliseconds, and the working oil flow rate is adjusted by the proportional solenoid valve 20.

Thus, as the change of the output operation value Voc computed by the computation circuit 14 is delayed relative to the change of the joystick voltage input value Vi from the joystick input device 11, the working oil flow rate controlled by the proportional solenoid valve 20 does not change suddenly due to sudden operation of a joystick 10, and a shock does not arise in the motion of the work machine.

The operational response of the proportional solenoid valve 20 can easily be changed by changing the number of data for computing the average value in the input circuit 13. That is, the response of the proportional solenoid valve 20 is increased by decreasing the number of data to compute the average value, and the response of the proportional solenoid valve 20 is lowered by increasing the number of data to compute the average value.

The input circuit 13 computes the average value of data read over a predetermined number of past occasions and the data read on the present occasion at each sampling time, and outputs this computation result at any time to the computation circuit 14.

The computation circuit 14 computes the output computation value Voc according to the joystick voltage operation value Vic sent from the input circuit 13.

Figure 5:
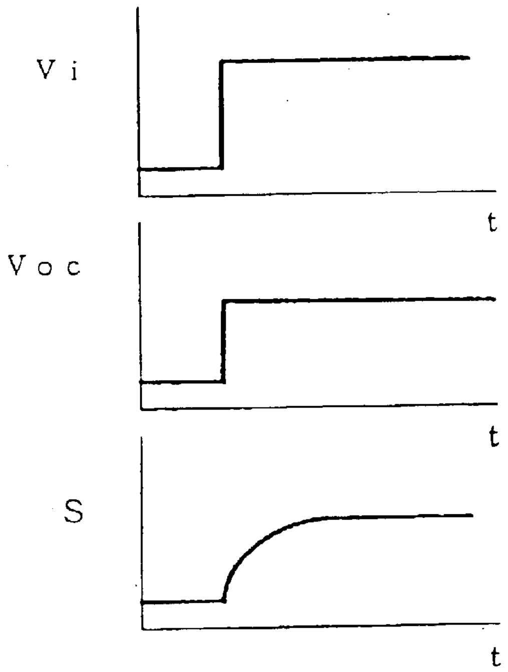
FIG. 5 is a characteristic diagram showing a relation between the joystick voltage input value Vi, output operation value Voc and the displacement amount S of the hydraulic cylinder according to the prior art.

When operation starts wherein the joystick 10 inclines from the neutral position, and the joystick voltage operation value Vic shifts from the neutral range to outside the neutral range, the joystick voltage input value Vi from the joystick input device 11 rises in a stepwise manner, as shown in FIG. 5. However, the rise of the output current I which flows in the proportional solenoids 21 due to the inductance produced in the coils of the proportional solenoid 21 is delayed. Further, as there is an overlap part in which the flow of working oil through the proportional solenoid valve 20 does not change even if the valve body is moved slightly, the change-over response of the proportional solenoid valve 20 is not fully obtained at the start of operation when the joystick 10 is pushed over from the neutral position, and the start of operation of the hydraulic cylinder 22 is delayed.

To deal with this, an operation start detection means is provided which detects the start of operation when the joystick 10 is pushed over from the neutral position. Thus, the computation circuit 14 increases the output computation value Voc to an effective value at the start of operation, momentarily causes the maximum rated current to flow in the proportional solenoids 21, and thereby increases the control response.

Also the operation start detection means of the joystick 10 has provided a detection resistance 17 connected with the proportional solenoids 21 in series, an amplifier 18 which amplifies the voltage across the ends of the detection resistance 17, and a comparator 19 which compares the amplified voltage with a threshold voltage output from the output circuit 15. From the amplifier 18, a voltage corresponding to the output current I is output to the comparator 19, and when the joystick 10 is operated outside the neutral range, the threshold voltage from the output circuit 15 is output to the comparator 19. The comparator 19 determines whether or not the voltage from the amplifier 18 has risen above the threshold voltage, and this determination result is fed back to the computation circuit 14 as a digital signal.

As the computation means of this invention, at the start of operation when the joystick 10 is outside the neutral range and until the current I corresponding to the threshold value flows through the proportional solenoids 21, based on a signal from the comparator 19, the computation circuit 14 makes the output computation value Voc an effective approximate maximum at which the maximum rated current flows in the proportional solenoids 21. When the current I corresponding to the threshold value flows in the proportional solenoids 21, the computation circuit 14 returns the output computation value Voc to the set value according to the joystick voltage input value Vi.

The output computation value Voc at the start of operation may be set arbitrarily according to the joystick voltage input value Vi, depending on the change-over response of the proportional solenoid valve 20 required, even if it is not increased to the effective maximum.

Figure 3:
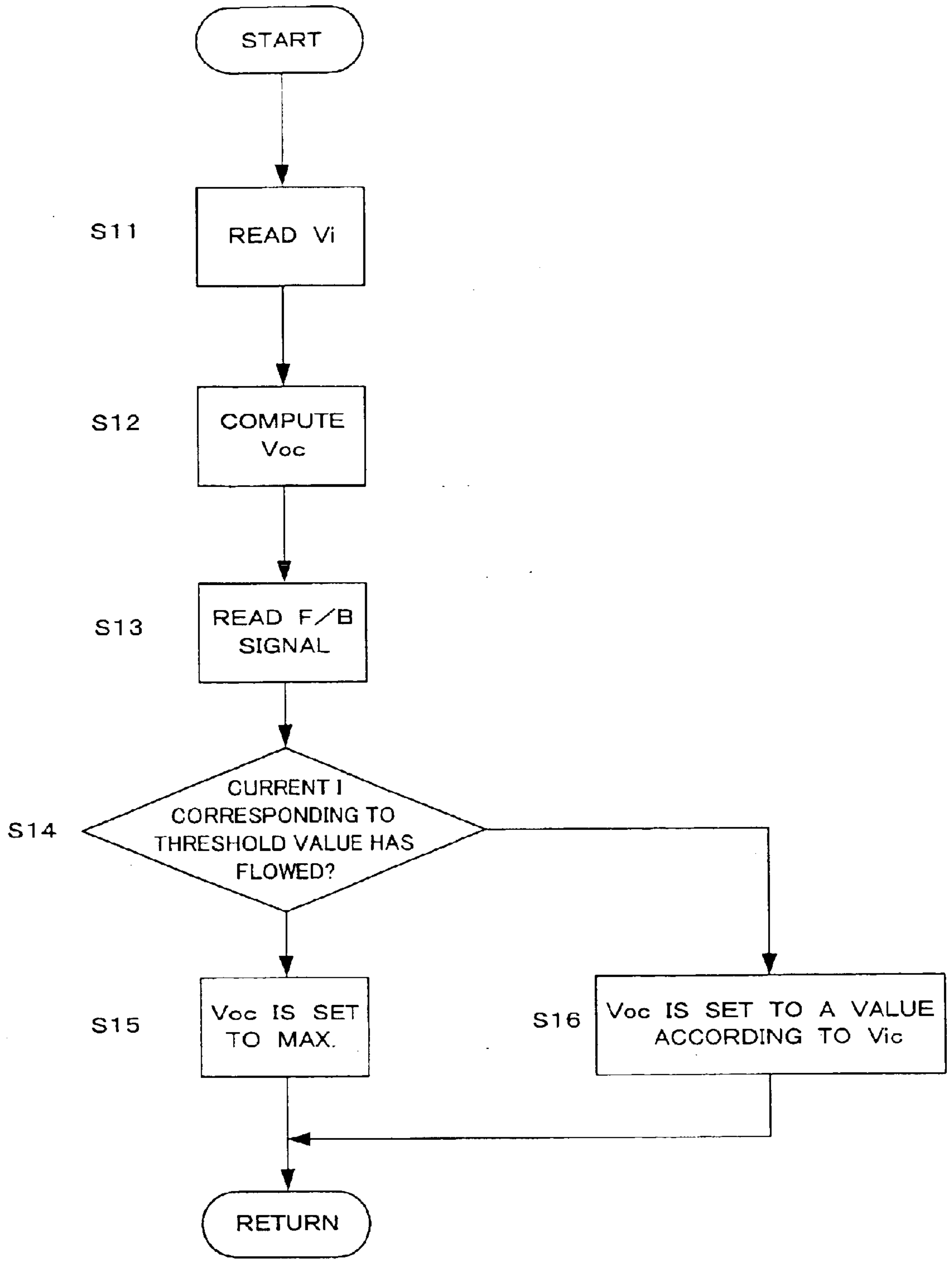
FIG. 3 is a flowchart showing the processing routine of a computation circuit.

The flowchart of FIG. 3 shows the processing routine of the computation circuit 14, and is performed at a fixed interval.

In a step S11, the joystick voltage operation value Vic sent from the input circuit 13 is read. In a step S12, the output computation value Voc according to the joystick voltage operation value Vic is calculated.

In a step S13, the feedback signal from the comparator 19 is read. In a step S14, it is determined whether or not the current I corresponding to the threshold value has flowed through the proportional solenoids 21.

Before the joystick voltage computation value Vic rises and the current I corresponding to the threshold value flows through the proportional solenoids 21, the routine proceeds to a step S15, and the output computation value Voc is set to the effective maximum.

When the joystick voltage computation value Vic rises and the current I corresponding to the threshold value flows through the proportional solenoids 21, the routine proceeds to a step S16 and the output computation value Voc is set to a value according to the joystick voltage computation value Vic.

Figure 4:
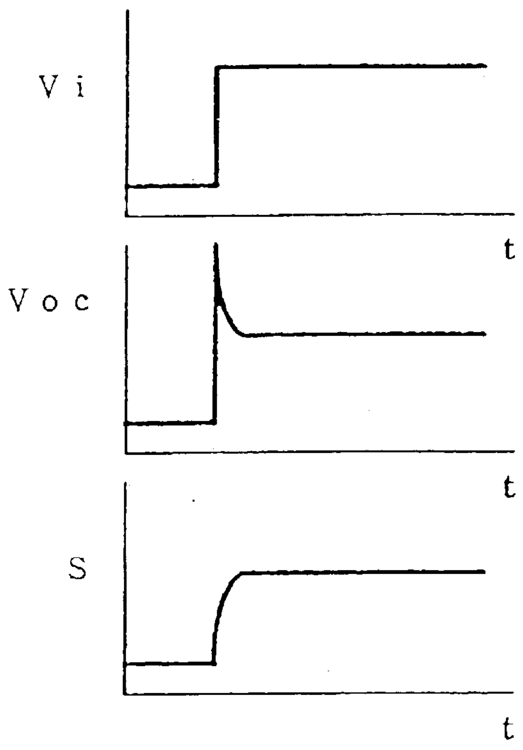
FIG. 4 is a characteristic diagram showing a relation between a joystick voltage input value Vi, output operation value Voc and a displacement amount S of a hydraulic cylinder.

As shown in FIG. 4, when the joystick voltage input value Vi from the joystick input device 11 rises at the time of start of operation of the joystick 10, the output computation value Voc momentarily increases to the effective maximum, and the maximum rated current I momentarily flows in the proportional solenoids 21. The effect of the inductance produced in the coils of the solenoids 21 is thereby decreased, and the current I which flows in the proportional solenoid valve 20 promptly increases.

Figure 6:
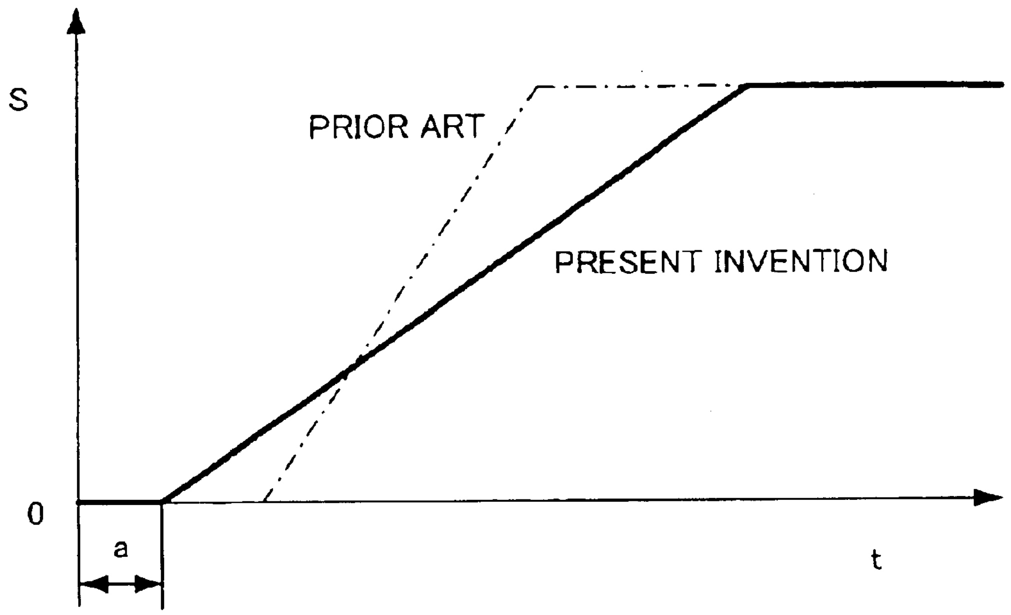
FIG. 6 is a characteristic diagram showing the relation of a time t after operating a joystick, and the displacement amount S of a hydraulic actuator.

The proportional solenoid valve 20 has an overlap part in which the flow of working oil does not change over even if the valve body slides slightly between each position. As the current I flowing in the proportional solenoid valve 20 increases rapidly at the time of start of operation of the joystick 10, the valve body moves promptly to the overlap part, the change-over response of the position is improved, and the start of operation of the hydraulic cylinder 22 is advanced. Consequently, the time required for the hydraulic cylinder 22 to start moving is short, as the solid line in FIG. 6 shows. On the other hand, after the valve body has moved through the overlap part, a sudden change of the current I flowing in the proportional solenoid valve 20 when there is a sudden operation of the joystick 10 is suppressed, and over-sensitivity in the motion of the hydraulic cylinder 22 is suppressed. As a result, the response with which the work device starts operation when the joystick 10 is operated, is improved, and the motion after operation starts is smooth.

Industrial Field of the Invention

As mentioned above, the signal processor of the joystick input device according to this invention is useful as a control device for work machines such as forklifts and power shovels, and suitable for use in a controller which controls the operation of a hydraulic actuator, especially through a proportional solenoid valve.

I claim:

1. A signal processor for a joystick that controls a solenoid comprising:

a joystick input device which controls a joystick voltage input value in response to an operating amount of a joystick from a neutral position, input means which outputs the average value of the joystick voltage input value read at every sampling time over a predetermined number of past occasions as a joystick voltage computation value, computation means which computes an output computation value set in response to the joystick voltage computation value, and operation start detecting means which detects an operation start when the joystick is pushed over from the neutral position, wherein the computation means increases the output computation value to a predetermined value in response to the joystick voltage compensation value and momentarily causes a predetermined maximum current corresponding to a threshold current value flowing through the solenoid when operation from the neutral position is detected to start.

2. A signal processor for a joystick that controls a solenoid, comprising:

a joystick input device which varies a joystick voltage input value according to an operating amount of a joystick from a neutral position, input means which outputs the average value of the joystick voltage input value read at every sampling time over a predetermined number of past occasions as a joystick voltage computation value, computation means which computes an output computation value set according to the joystick voltage computation value, and operation start detecting means which detects an operation start when the joystick is pushed over from the neutral position, wherein the computation means increases the output computation value to an effective maximum value corresponding to a threshold current value flowing through the solenoid and momentarily causes a predetermined maximum current when operation from the neutral position starts.

3. A signal processor for use between a manually operable input arrangement and a proportional solenoid valve that is coupled to a hydraulic cylinder, the input arrangement providing an input signal, said signal processor comprising:

means for sampling the input signal to generate a sequence of digital samples;

means for generating a sequence of digital computed values from a latest one of the samples and a predetermined number of earlier samples;

means for converting the digital computed values to an analog signal;

a drive circuit that supplies drive current to the proportional solenoid valve in response to the analog signal; and means, responsive to the drive current, for detecting when the input arrangement is displaced from a neutral position, wherein the drive current is temporarily increased to a predetermined maximum value when the means for detecting detects that the input arrangement has been displaced from the neutral position.

4. The signal processor of claim 3, wherein the input arrangement comprises a joystick.

5. The signal processor of claim 3, wherein the computed values are averages.

* * * * *